(12) United States Patent
Bhakta

(10) Patent No.: US 6,256,159 B1
(45) Date of Patent: Jul. 3, 2001

(54) METHOD AND CIRCUIT FOR DIBIT DETECTION

(75) Inventor: Bhavesh G. Bhakta, Norwalk, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/323,595

(22) Filed: Jun. 1, 1999

(51) Int. Cl.[7] ..................................................... G11D 5/09
(52) U.S. Cl. .................. 360/40; 360/46; 360/53
(58) Field of Search ........................... 360/40, 46, 67, 360/53, 65, 25; 375/350; 714/817; 341/58

(56) References Cited

U.S. PATENT DOCUMENTS

| | | | |
|---|---|---|---|
| 5,262,904 | * | 11/1993 | Tang et al. ............................... 360/45 |
| 5,608,583 | * | 3/1997 | Shrinkle ................... 360/46 |
| 5,706,222 | * | 1/1998 | Bonaccio et al. ....................... 360/46 |
| 6,091,560 | * | 7/2000 | Du ......................................... 360/25 |

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A circuit (10) and method for dibit detection in a mass data storage device includes concurrently operating magnitude (16), polarity (18), and peak value (20) qualification circuits. The magnitude qualification circuit (16) produces a magnitude qualification output signal when a magnitude of the read back signal exceeds a predetermined magnitude threshold. The polarity qualification circuit produces a polarity qualification output signal when a polarity of the read back signal is of a predetermined polarity. The peak value qualification circuit produces a peak value qualification output signal at a time at which a peak value of the read back signal occurs during a predetermined period. When the magnitude qualification output signal, the polarity qualification output signal, and the peak value qualification output signals simultaneously occur, a dibit detection signal (118) is produced.

16 Claims, 4 Drawing Sheets

METHOD AND CIRCUIT FOR DIBIT DETECTION

BACKGROUND OF THE INVENTION

1. Field of the Invention

This invention relates to improvements in signal processing techniques and circuits, and more particularly to improvements in signal processing techniques and circuits of the type used in data processing channels, such as may be used in mass data storage devices, or the like.

2. Relevant Background

This invention relates, in general, to mass data storage devices, or the like. Recently there have been many advances in such devices, resulting in increased speed and decreased cost. However, in order to achieve these advances, many compensating considerations need to be implemented. For example, recently magneto-resistive (M/R) read/write transducers, or heads, have been proposed to serve the function of detecting the magnetic fluctuations of the spinning disk data media and transducing them to electrical signals for processing. The M/R heads are particularly popular, primarily because of their reliability and inexpensive construction. One of the tradeoffs, however, for the reliability and inexpensive construction is that M/R heads produce an asymmetrical output waveform. The asymmetry of the output waveform requires special filtering or compensation for accurate decoding.

One of the engineering goals in the design of a mass data storage device is to achieve as low a bit-error-rate as possible in order to achieve a read signal that is as reliable and accurate as possible. One technique that has been employed is to detect a "di-bit", rather than a single pulse output from the head. A di-bit, generally refrerred to simply as a "dibit" is a pair of sequential bits, the first bit being of a first polarity, the subsequent bit being of an opposite polarity. For example, if the first bit is negative, the dibit has a positive bit next immediately following. Alternatively, if the first bit is positive, the dibit has a negative bit next immediately following.

When a dibit is detected, it may be stored for subsequent decoding of the data it represents. For instance, in modern mass data storage devices, data is recorded onto a magnetic data disk. The data records are arranged in concentric rings from the interior of the disk radially outwardly to the periphery of the disk. The data tracks are numbered, usually using a Gray code scheme that enables particular tracks to be rapidly located. Within each track are a number of sectors, which also have identification indicators to identify the location of particular user data that may be written on that particular track. The track and sector data are written to specific portions of each respective track for ease in detection; however, again, a significant amounts of data processing and concomitant circuitry is required for increased data access speed.

The data pulses are recorded onto the magnetic media originally by a pulse pattern that includes first a positive (or negative) signal pulse, followed by a negative (or positive) signal pulse. When the data pulse is read back from the disk, the resulting data pattern very closely approximates a sine wave, except, as noted above, when M/R heads are employed as the data transducer, the symmetry of the read back signal is not perfect. Often the positive portion of the read back signal is distorted and is larger than the negative portion of the signal.

In order to detect the existence of the read back sine wave, usually a peak detection technique was employed that employed a sign reversal detection method. The theory is that if the sign of the read back signal changed, the peak of the read back sine wave had occurred. However, often noise or other signal disturbances would introduce signal levels that could be misinterpreted for a sign reversal, thereby falsely detecting the signal, i.e., the dibit. It should be appreciated that the read back signal is digitized relatively early in the signal-processing path. As a result, slope reversal detection in the past has been determined by comparing the signs of adjacent data. This makes the sign reversal technique even more "brittle", since a sign change between two adjacent signal values may not represent the maximum value of the overall signal, at all.

Other types of dibit detectors have been used, as well. For example, dibit detectors have been used that employ a analog peak detector that detects an initial signal peak and when the peak is detected, the circuit triggers a timer, such as a one-shot multivibrator. The one-shot multivibrator establishes a time during which the peak of a reverse signal must occur for a dibit to be detected. This type of dibit detector also has several disadvantages. For example, if a phase shift occurs in the input signal after the first peak has been detected, the dibit may be missed. Also, if the time period of the one-shot multivibrator is not well defined, the time period may expire before the occurrence of the peak of the second portion of the dibit. These deficiencies, of course, lead to increased bit detection errors.

In order to digitize the read back signal, generally sampling techniques are employed. Typically, the signal is oversampled at a rate consistent with the bandwidth of the signal processing circuitry. It can be seen, however, that if the bandwidth of the processing circuitry is relatively low, the sampling rate also must be proportionally low to enable the read back signal to be properly interpreted.

Finally, in the past, the various data processes that are applied to the read back signal have been performed serially, or sequentially. This has the disadvantage in slowing down, or more accurately, limiting the speed at which the signal can be processed to achieve a given bit error rate. This is because the AGC loop performance is adversely impacted due to increased latency, resulting in decreased bit error rate. This results, moreover, in limiting the disk access time, since the read back data has to be read completely before the heads can be properly positioned to read the user data needed.

SUMMARY OF THE INVENTION

In light of the above, it is an object of the invention to provide an improved dibit detector that performs various signal processing which, among other things, processes in parallel for increased signal processing speed. This is particularly useful in increasing performance for Gray code detection in mass data storage devices, or the like.

These and other objects, features and advantages of the invention will be apparent to those skilled in the art from the following detailed description of the invention, when read in conjunction with the accompanying drawings and appended claims.

According to a broad aspect of the invention, a digital dibit detector is presented in which a band pass filter is connected to receive a sampled signal to produce a filter output signal. A magnitude qualification circuit compares an absolute value of the filter output signal to a programmable qualification threshold value to produce a qualified magnitude output signal. A polarity qualification circuit compares a sample polarity of the filter output signal to a programmable dibit polarity to produce a qualified polarity output signal and a local peak qualification circuit qualifies a largest sample magnitude of the filter output signal within a window as a peak to produce a peak output signal. A circuit receives the qualified magnitude output signal, the qualified polarity output signal, and the peak output signal, to produce a dibit detection signal when the qualified magnitude output signal, the qualified polarity output signal, and the peak output signal are of the same state.

According to another broad aspect of the invention, a method is provided for asynchronous digital dibit detection. The method includes concurrently band pass filtering a sampled signal to produce a filter output signal, magnitude qualifying the filter output signal by comparing an absolute value of the of the filter output signal to a programmable qualification threshold value to produce a qualified magnitude output signal, polarity qualifying the filter output signal by comparing a sample polarity to a programmable dibit polarity to produce a qualified polarity output signal, and local peak qualifying the filter output signal by qualifying a largest sample magnitude within a window as a peak to produce a peak output signal. When the qualified magnitude output signal, the qualified polarity output signal, and the peak output signal are of the same state, a dibit detection signal is produced.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
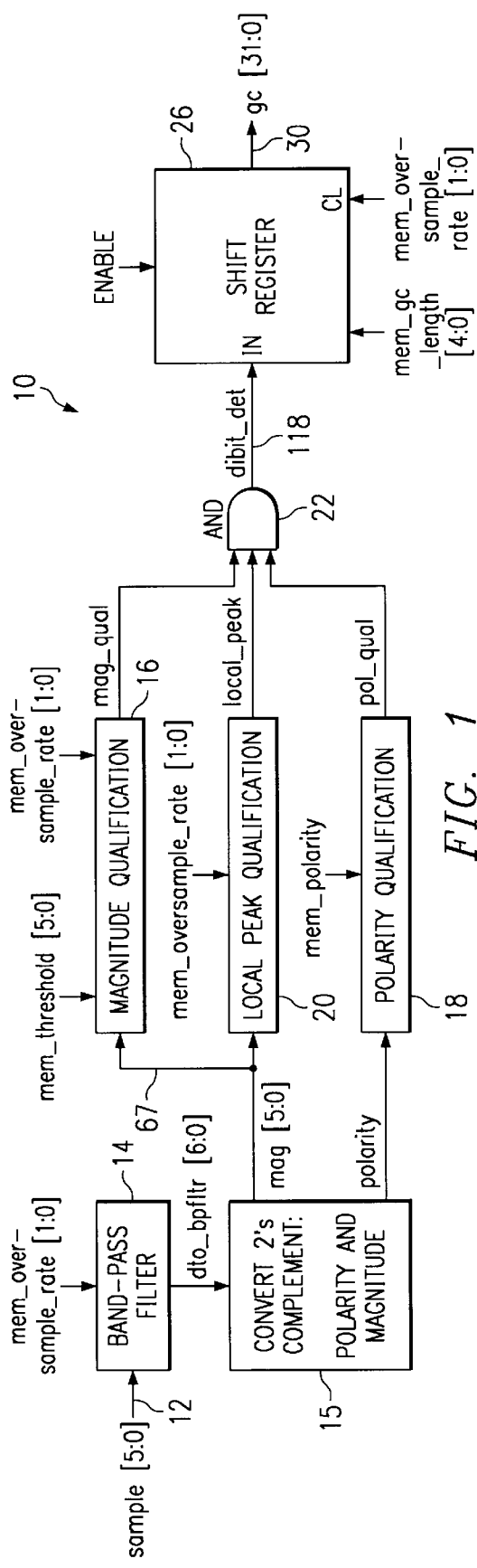
FIG. 1 is a block diagram of a dibit system according to a preferred embodiment of the invention.

A box diagram of a dibit detector 10 according to a preferred embodiment of the invention is shown in FIG. 1, to which reference is now made. The dibit detector 10 receives a sampled input signal on line 12, and conducts it to a band pass filter 14. The sampled input signal may be similar to that ordinarily found or used in the prior art. The sampled signal on input line 12 may be, for example, derived from an analog signal developed at the output of a magneto/resistive (M/R) head signal transducer, or other appropriate signal transducer, that may be used in conjunction with a mass data storage device (not shown). Typically, prior to reaching the band pass filter 14, the analog signal has been amplified, and the amplified signal sampled in an analog-to-digital converter at a predetermined sampling rate. For example, in the embodiment shown, signal may be sampled at an oversampling rate, for example, of 16 times the data rate; however, other sampling rates can be used, depending upon the overall band width of the circuit, and other factors.

As mentioned above, the signal that is developed by an M/R head typically has undesirable DC offsets in it, as well as a distortion factor in which the positive portion of the signal is larger than the negative portion of the signal (or vice versa). Consequently, the band pass filter 14, described below in detail, preferably includes characteristics to enable the DC offsets to be removed, as well as the even harmonics to be filtered. The band pass filter 14 also preferably includes characteristics to enable the DC offsets to be removed.

The output from the band pass filter 14 is applied concurrently to three signal qualifying circuits. The first circuit is a magnitude qualifier circuit 16. The second is a polarity qualifier circuit 18. The third is a local peak qualifier circuit 20.

The magnitude qualifier circuit 16, which is described in detail below, operates to compare the absolute value of the signal that is generated at the output of the band pass filter 14 to a qualification threshold. The qualification threshold may, if desired, be programmably adjustable in the magnitude qualifier circuit 16. The magnitude qualifier circuit 16 assures that the signal at the output of the band pass filter 14 is of the correct magnitude to ensure that a sine wave representing a dibit is present.

The polarity qualifier circuit 18, also described in detail below, serves to determine the polarity of the signal at the output of the band pass filter 14. As indicated above, a dibit is a sequence of first and second signals of opposite polarity. Since the polarity may be in either direction, the polarity qualifier circuit 18 may be programmable to detect the occurrence first of a positive or negative single polarity and subsequently a negative or positive signal polarity.

The local peak qualifier circuit 20, described in detail below, serves to qualify the sample magnitude of the signal at the output of the band pass filter 14 within a window that corresponds to ½ of the period of the sign wave representing the dibit to be detected. The local peak qualifier circuit operates upon the digital signal that is developed at the output of the band pass filter 14 to compare adjacent signal values at each of the oversampled time periods. Consequently, the operation of the local peak qualifier circuit 20 is more robust than, for instance, slope detectors that were used in the prior art, since the circuit is relatively immune to noise and spurious slope changes.

The outputs of each of the qualifier circuits 16, 18, and 20 are connected to the inputs of an AND gate 22. Thus, it can be seen that when each of the qualifier circuits 16, 18, and 20 find the particular signal characteristic that they are respectively designed to detect, each circuit produces an output state that corresponds to the output state of the other qualifiers circuits. For example, in a preferred embodiment, each of the qualifier circuits 16, 18, and 29 produces an output high state. The concurrence of all 3 high states is detected by the AND gate 22 to generate a high output state on output line 24.

The high state on output line on 24 represents the detection of a dibit. The output line 24 is connected to an input terminal of a shift register 26, to be clocked therein by a clock signal having a clock rate of 16 times the sample rate, i.e., corresponding to the period of the dibit input. The clock pulses are provided by a 16X sample clock circuit.

Figure 6:
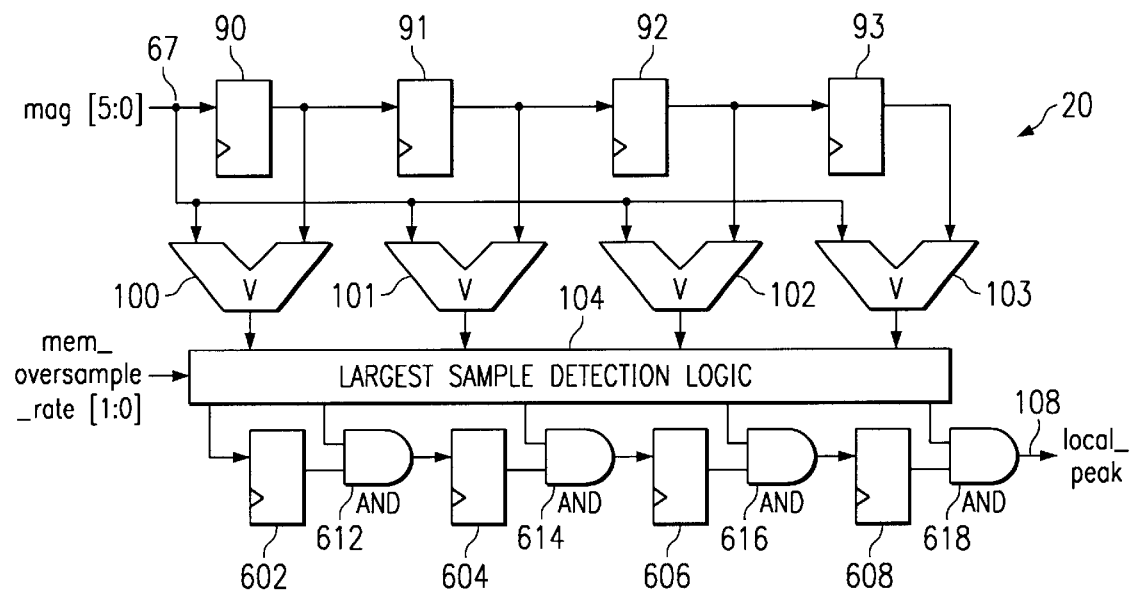
FIG. 6 is a block diagram of a local peak qualification circuit that may be used in the dibit system of FIG. 1.

FIG. 6 illustrates NAND circuits (612, 614, 616 and 618) and delay circuits (602, 604, 606 and 608).

Once a predetermined number of dibits have been shifted into the shift register 26, they can be read out in parallel on output lines 30 for use, for example, in providing Gray code information, or other information useful in the operation of the mass data storage device in which the dibit detector is used.

Figure 2:
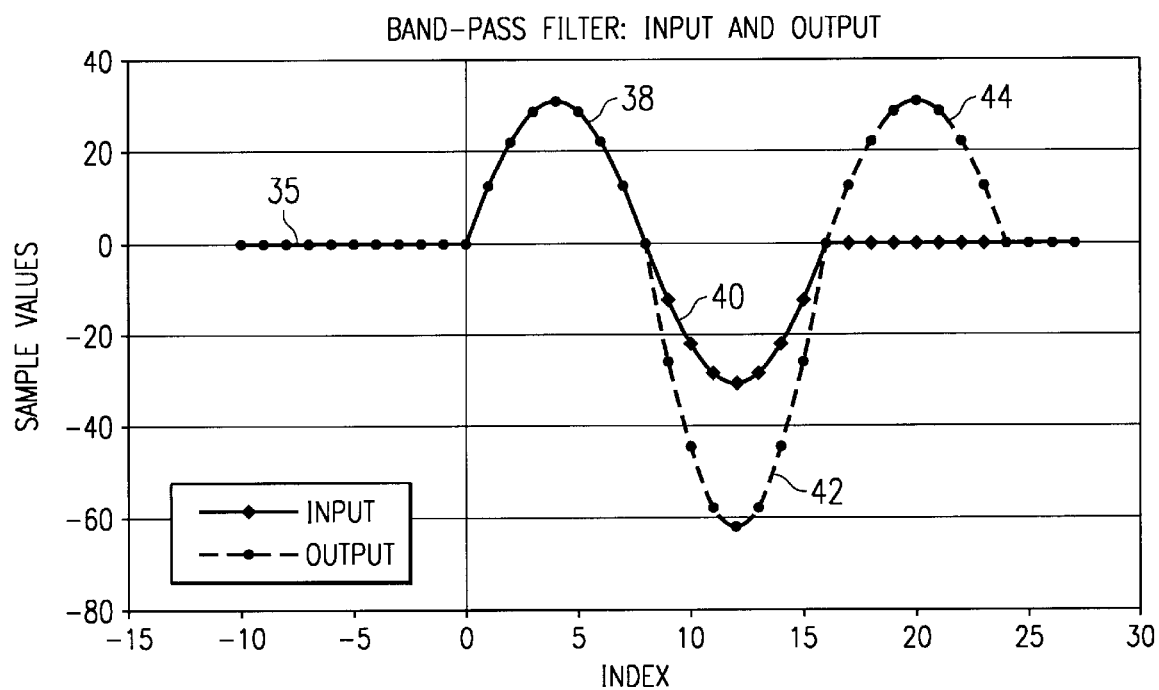
FIG. 2 is a graph comparing an input dibit signal to the band pass filter in the dibit system of FIG. 1 with the output signal produce thereby to enable dibit detection

The operation of the band pass filter 14 is shown in the graph of FIG. 2 to which reference is now additionally made. The waveforms of FIG. 2 also serve to illustrate the manner by which the circuit 10 is used to detect the occurrence of a dibit. More particularly, the input signal denoted by the dotted lines with diamond point indicators at each sample period represents a complete sine wave followed by a zero value that extends for ½ of the sine wave. It should be noted that the values of the signals shown in FIG. 2 are the sampled values of the signals indicated. The indicated values, of course, represented digital values, since the signals into and out from the band pass filter 14 are digitized signals.

The operation of the band pass filter 14 is to accumulate, or delay, the incoming signal, then subtract the value that occurred 180 degrees previously from the then instantaneously received value. For example, as can be seen, if the initial signal and output are zero, as indicated by the waveform portion 35 when the first 180 degrees of the sine wave occurs, the previous zero value is subtracted from the instantaneously occurring value, resulting in a normal ½ positive sine wave output, as shown by the waveform portion 38. As the sine wave then the progresses to its negative excursion 40 between 180 degrees and 360 degrees, the respective portions preceding the instantaneous value by 180 degrees are subtracted from the input signal. This results in a sine wave segment of negative polarity and of amplitude twice that of the original input sine wave. This is shown by the waveform segment 42. Thereafter, if the input value is again zero during the next ½ period, from which is subtracted the previously occurring waveform segment 40, the positive waveform segment 44 is produced. Since the waveform that is produced at the output of the band pass filter 14 occurs with a negative polarity and amplitude of twice the amplitude of the negative excursion of a normal sine wave, it can be seen that in order to detect the occurrence of a dibit, only the oversize, negative waveform portion 42 need be detected.

Figure 3:
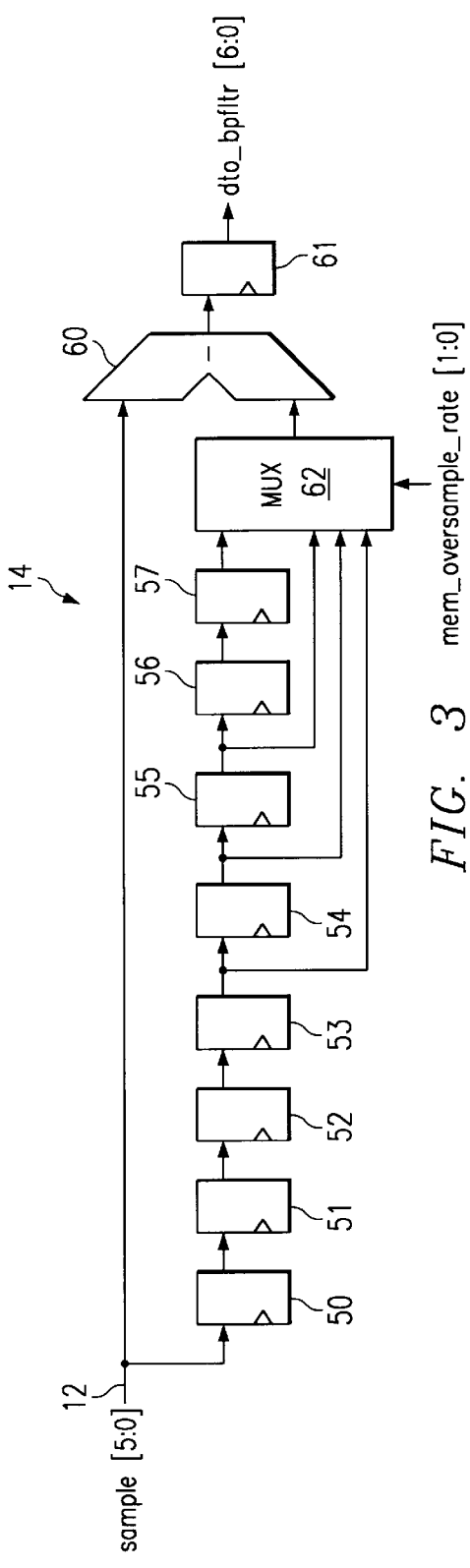
FIG. 3 is a block diagram of a band pass filter circuit that may be used in the dibit system of FIG. 1.

The construction of the band pass filter 14 to enable the transfer characteristic described above with reference to FIG. 2 is shown in detail in FIG. 3 to which reference is now additionally made. The band pass filter 14 includes a plurality of delay blocks 50–57, through which the input signal on line 12 is passed. Each of the delay elements 50–57 may be, for example, a D-type flip-flop, and each may be clocked by a common clock signal from a clock generator (not shown) at the sample rate at which the input signal on line 12 is sampled. In operation, the input signal which has been delayed by a the delay elements 50–57, representing a signal having a delay of ½ of the period of the desired dibit waveform signal to be detected, is subtracted from the instantaneously occurring input signal in a subtractor 60. The output from the subtractor 60 is applied to a D-type flip-flop 61, which is clocked by the sampling clock to produce the output for application to the qualification circuits, described below in detail.

The band pass filter 14 may, if desired, be made programmable in order to select the delay to which the input signal is subjected before being subtracted from the instantaneously occurring input signal. The number of delay elements, therefore, corresponds to the sampling rate of the input signal. Thus, a multiplexer 62 is provided by which different sampling rates can be selected for subtraction from the instantaneously occurring input signal.

Figure 4:
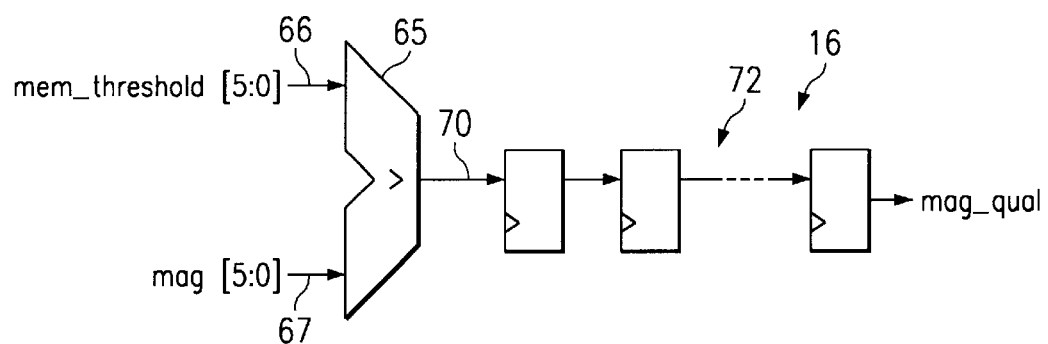
FIG. 4 is a block diagram of a magnitude qualification circuit that may be used in the dibit system of FIG. 1.

The output from the band pass filter 14 is connected to the input of a polarity and magnitude converting circuit 15. The polarity and magnitude converting circuit 15 produces two outputs, the first being directed to the magnitude qualifier circuit 16 and the second output being directed to the local peak qualification qualifier circuit 20. The polarity and magnitude converting circuit is converts its input signal to a 2's complement signal for use of subsequent signal processing. The signal is applied to the magnitude qualification circuits 16, details of which are shown in a FIG. 4, to which reference is now additionally made. The output signal from the polarity and magnitude converter circuit 15 is supplied as an input to a comparator 65. A threshold signal, which may be provided from a memory device, not shown, on line 66 is provided to another input to the comparator 65. When the input signal on line 67 exceeds a value supplied on line 66, an output is generated from the comparator 65 on an output line 70. If needed, the output signal on line 70 may be delayed by a number of delay elements 72 so that the timing of the signal can be synchronized with the timing of the signals produced by the other qualification circuits, and, and particular, to the peak qualification circuit 18 described below. The number of delay elements that are provided, of course, depends upon the required time delay for synchronization. The purpose of the magnitude qualification circuit 16 is to detect the occurring of the oversized (2X) sine wave segment 42, illustrated in a FIG. 2, which, as indicated above, is one of the characteristics of a dibit.

Figure 5:
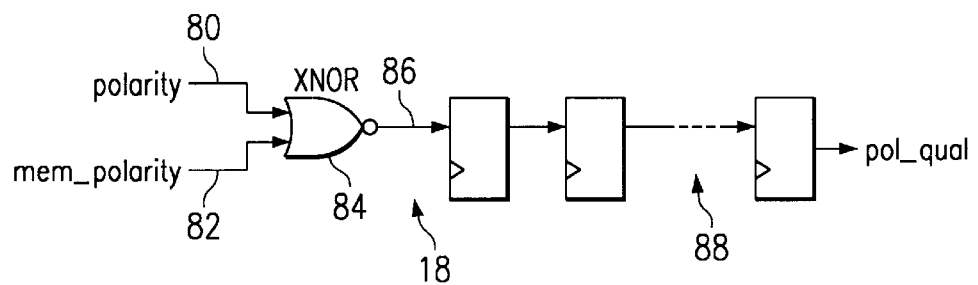
FIG. 5 is a block diagram of a polarity qualification circuit that may be used in the dibit system of FIG. 1.

Concurrently, the polarity and magnitude converting circuit 15 provides an input to the polarity qualification circuit 18, details of which are shown in FIG. 5, to which reference is now additionally made. The polarity qualification circuit 18 determines the polarity of the signal input thereto on line 80 by comparison thereof to a polarity signal stored in a memory, not shown, on input line 82. The comparison may be performed, for example, by an XNOR gate 84 to produce an output on line 86, as shown. The output signal on line 86 may be delayed by a number of delay elements 88, to enable the polarity qualification signal to be synchronized with the outputs from the other qualification circuits. The number of delay elements that are provided, of course, depends upon the required time delay for synchronization. The purpose of the polarity qualification circuit 18 is to ensure that the signal being detected is a negative signal corresponding to the 2X negative waveform 42 shown in FIG. 2.

Concurrently with the signal processing occurring in the magnitude qualification circuit 16 and the polarity qualification circuit 18, the local peak qualification is performed in the peak qualification circuit 20. The details of the peak qualification circuit 20 are shown in FIG. 6 to which reference is now additionally made. More particularly, the output from the polarity and magnitude converter circuit 15 is applied as an input on line 67 to a series of delay elements 90–93. Each of the delay elements 90–93 is clocked by the sample clock signal, not shown, to produce an output respectively to comparators 100–103. The input signal on line 67 is applied to each of the comparators 100–103 for successive comparison to the delayed previous values produced by the delay elements 90–93.

The sample values produced by the comparators 100–103 then are compared in a largest-sample detection logic circuit 104, which is programmable to select the particular oversample rate at which the dibit detector circuit 10 is operated. The outputs from the largest-sample detection logic circuit 104 are successively delayed and compared to each respective next preceding output, so that when the largest value is detected, an output is produced on output line 108.

Figure 7:
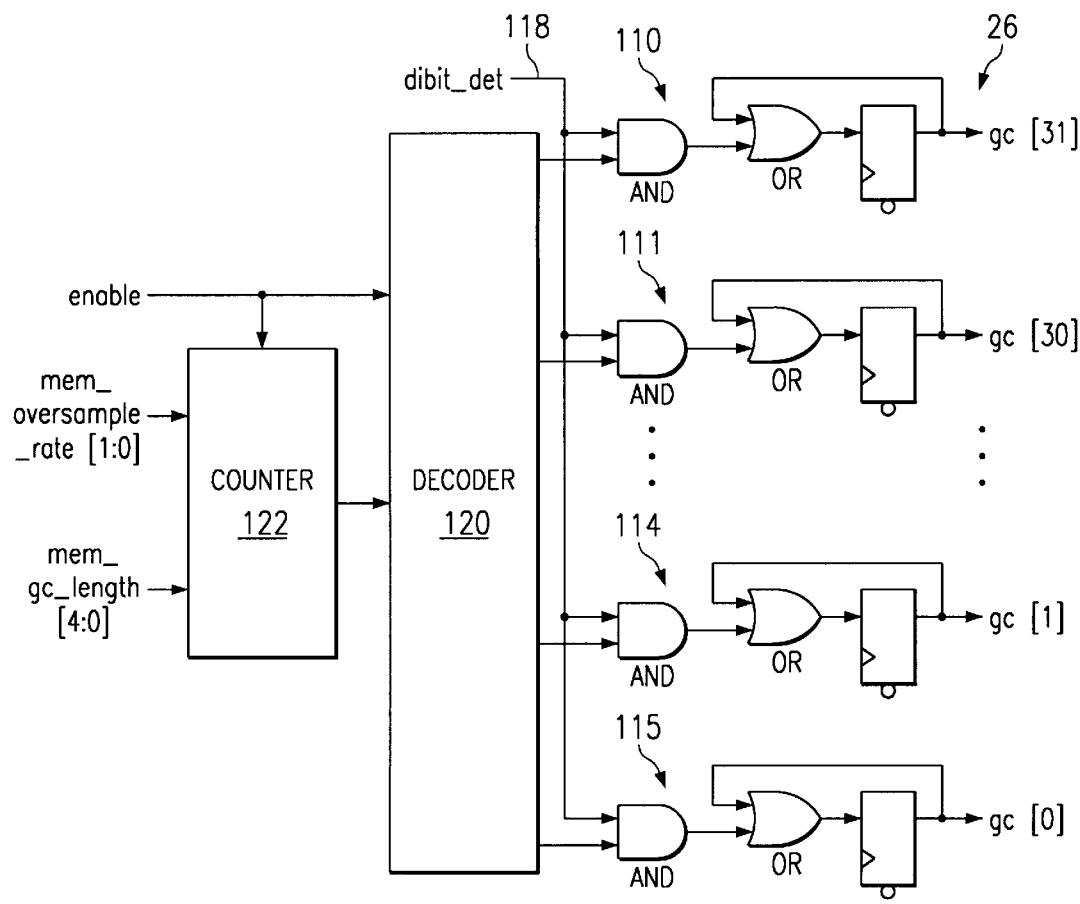
FIG. 7 is a block diagram of a shift register circuit that may be used in the dibit system of FIG. 1.

Consequently, concurrently developed and synchronized output signals are produced at the respective outputs of the magnitude, local peak, and polarity qualification circuits when the 2X negative waveform 42, which is produced upon the occurrence of a dibit on the input line, is detected. As described above, the concurrently occurring output signals are detected by the AND gate 22 to provide a dibit detected signal to the input of a shift register 26. Details of a suitable shift register are shown in the FIG. 7, to which reference is now additionally made. The shift register 26 includes a number of register sections 110, 111 . . . 114, and 115, the number of which corresponds to the desired number of dibits that form the desired Gray code word, or other signal to be detected. The "dibit detected" signal on line 118 is connected to each of the register stages 110, 111 . . . 114, and 115, together with signals from a decoder circuit 120. The decoder 120 decodes signals input thereto from a counter 122 which produces an output dependent upon programmable oversample rate and memory length signals to enable the number of Gray code bits to be programmably adjusted. The counter 122 is clocked by the oversample clock, not shown.

It should be noted that one of the advantages that can realized by the circuit described above is that it can be operated asynchronously, without a requirement for timing recovery from the read back signal. This eliminates the need for a significant amount of timing recovery circuitry, and results in a more reliable circuit operation. Other advantages will be apparent to those skilled in the art.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A digital dibit detector, comprising:

a band pass filter connected to receive a sampled signal to produce a filter output signal;

a magnitude qualification circuit to compare an absolute value of the filter output signal to a programmable qualification threshold value to produce a qualified magnitude output signal;

a polarity qualification circuit to compare a sample polarity of the filter output signal to a programmable dibit polarity to produce a qualified polarity output signal;

a local peak qualification circuit to qualify a largest sample magnitude of the filter output signal within a window as a peak to produce a peak output signal;

a circuit to receive said qualified magnitude output signal, said qualified polarity output signal, and said peak output signal, to produce a dibit detection signal when said qualified magnitude output signal, said qualified polarity output signal, and said peak output signal are of the same state.

2. The dibit detector of claim 1 wherein said band pass filter is constructed to remove dc offsets from said sampled signal in said filter output signal.

3. The dibit detector of claim 1 wherein said band pass filter is constructed to remove even harmonics from said sampled signal in said filter output signal.

4. The dibit detector of claim 1 wherein said circuit to produce a dibit detection signal is an AND gate.

5. A method for digital dibit detection, comprising:

band pass filtering a sampled signal to produce a filter output signal;

magnitude qualifying said filter output signal by comparing an absolute value of the filter output signal to a programmable qualification threshold value to produce a qualified magnitude output signal;

polarity qualifying said filter output signal by comparing a sample polarity to a programmable dibit polarity to produce a qualified polarity output signal;

local peak qualifying said filter output signal by qualifying a largest sample magnitude within a window as a peak to produce a peak output signal;

producing a dibit detection signal when said qualified magnitude output signal, said qualified polarity output signal, and said peak output signal are of the same state.

6. The method of claim 5 wherein said band pass filtering step comprises removing dc offsets from said sampled signal.

7. The method of claim 5 wherein said band pass filtering comprises removing even harmonics from said sampled signal.

8. The method of claim 5 wherein said producing a dibit detection signal comprises ANDing said qualified magnitude output signal, said qualified polarity output signal, and said peak output signal.

9. A method for dibit detection in a mass data storage device, comprising:

generating a magnitude qualification signal when a magnitude of a read back signal of said storage device exceeds a predetermined magnitude threshold;

generating a polarity qualification signal when a polarity of the read back signal is of a predetermined polarity;

generating a peak value qualification signal at a time at which a peak value of the read back signal occurs during a predetermined period;

and generating a dibit detection output signal state if said magnitude qualification signal, said polarity qualification signal, and said peak value qualification signal simultaneously occur.

10. The method of claim 9 further comprising band pass filtering said read back signal prior to said generating steps.

11. The method of claim 10 wherein said band pass filtering includes eliminating dc offsets of said read back signal.

12. The method of claim 10 wherein said band pass filtering includes filtering even harmonics from said read back signal.

13. A circuit for dibit detection in a mass data storage device, comprising:

a magnitude qualification circuit to produce a magnitude qualification output signal when a magnitude of said read back signal exceeds a predetermined magnitude threshold;

a polarity qualification circuit that operates simultaneously with said magnitude qualification circuit to produce a polarity qualification output signal when a polarity of the read back signal is of a predetermined polarity;

a peak value qualification circuit that operates simultaneously with said magnitude qualification and said polarity qualification circuits to produce a peak value qualification output signal at a time at which a peak value of the read back signal occurs during a predetermined period;

and a circuit to produce a dibit detection output signal if said magnitude qualification output signal, said polarity qualification output signal, and said peak value qualification output signals simultaneously occur.

14. The circuit of claim 13 further comprising a band pass filter to filter said read back signal before said read back signal is applied to said qualification circuits.

15. The circuit of claim 14 wherein said band pass filter includes a dc offset filter.

16. The circuit of claim 14 wherein said band pass filter includes an even harmonic filter.

* * * * *